United States Patent
Hefel et al.

(10) Patent No.: US 11,212,210 B2
(45) Date of Patent: Dec. 28, 2021

(54) SELECTIVE ROUTE EXPORTING USING SOURCE TYPE

(71) Applicant: Silver Peak Systems, Inc., Santa Clara, CA (US)

(72) Inventors: Timothy Robert Hefel, San Carlos, CA (US); Jigar Chheda, Highlands Ranch, CO (US); Manoj Kulkarni, Fremont, CA (US); Damon John Ennis, San Jose, CA (US); David Anthony Hughes, Los Altos Hills, CA (US); Rolf Muralt, Palo Alto, CA (US); Pawan Kumar Singh, Los Altos, CA (US)

(73) Assignee: Silver Peak Systems, Inc., Santa Clara, CA (US)

(*) Notice: Subject to any disclaimer, the term of this patent is extended or adjusted under 35 U.S.C. 154(b) by 0 days.

(21) Appl. No.: 15/712,006

(22) Filed: Sep. 21, 2017

(65) Prior Publication Data
US 2019/0089620 A1 Mar. 21, 2019

(51) Int. Cl.
*H04L 12/751* (2013.01)
*H04L 12/715* (2013.01)

(52) U.S. Cl.
CPC .......... *H04L 45/02* (2013.01); *H04L 45/04* (2013.01)

(58) Field of Classification Search
CPC .................................................. H04L 45/02
See application file for complete search history.

(56) References Cited

U.S. PATENT DOCUMENTS

| | | |
|---|---|---|
| 4,494,108 A | 1/1985 | Langdon, Jr. et al. |
| 4,558,302 A | 12/1985 | Welch |
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |

(Continued)

FOREIGN PATENT DOCUMENTS

| | | |
|---|---|---|
| EP | 1507353 A2 | 2/2005 |
| JP | H05061964 A | 3/1993 |
| WO | WO0135226 A1 | 5/2001 |

OTHER PUBLICATIONS

RFC 1997, "BGP Communities Attribute", Internet Engineering Task Force (IETF), 5 Pages. (Year: 1996).*

(Continued)

*Primary Examiner* — Ajit Patel
*Assistant Examiner* — Liem H. Nguyen

(57) ABSTRACT

Systems and methods for selectively advertising routing information by a network appliance to a neighboring computing device are disclosed. In exemplary embodiments, customized export policies are created based on source type for each neighboring computing device to a network appliance. A source type for routing information is determined by the network appliance. The routing information is exported by the appliance to the neighboring computing device, such as a BGP router, based on the customized export policy associated with the source type.

21 Claims, 9 Drawing Sheets

Appliance 250b Route Table Manager

| IP Subnet | Route Type | BGP Comm. |
|---|---|---|
| 1.1.1.0/24 | LOCAL_SUB | 100 |
| 2.2.2.0/24 | LOCAL_SUB | 100 |
| 3.3.3.0/24 | LOCAL_SUB | 100 |
| 4.4.4.0/24 | SHARED_SUB | 200 |
| 5.5.5.0/24 | BGP_BRANCH | 400 |
| 10.1.1.0/24 | REMOTE_BGP | 600 |

(56) References Cited

U.S. PATENT DOCUMENTS

| | | | |
|---|---|---|---|
| 5,532,693 | A | 7/1996 | Winters et al. |
| 5,592,613 | A | 1/1997 | Miyazawa et al. |
| 5,602,831 | A | 2/1997 | Gaskill |
| 5,608,540 | A | 3/1997 | Ogawa |
| 5,611,049 | A | 3/1997 | Pitts |
| 5,627,533 | A | 5/1997 | Clark |
| 5,635,932 | A | 6/1997 | Shinagawa et al. |
| 5,652,581 | A | 7/1997 | Furlan et al. |
| 5,659,737 | A | 8/1997 | Matsuda |
| 5,675,587 | A | 10/1997 | Okuyama et al. |
| 5,710,562 | A | 1/1998 | Gormish et al. |
| 5,748,122 | A | 5/1998 | Shinagawa et al. |
| 5,754,774 | A | 5/1998 | Bittinger et al. |
| 5,802,106 | A | 9/1998 | Packer |
| 5,805,822 | A | 9/1998 | Longetai. |
| 5,883,891 | A | 3/1999 | Williams et al. |
| 5,903,230 | A | 5/1999 | Masenas |
| 5,955,976 | A | 9/1999 | Heath |
| 6,000,053 | A | 12/1999 | Levine et al. |
| 6,003,087 | A | 12/1999 | Housel, III et al. |
| 6,054,943 | A | 4/2000 | Lawrence |
| 6,081,883 | A | 6/2000 | Popelka et al. |
| 6,084,855 | A | 7/2000 | Soirinsuo et al. |
| 6,175,944 | B1 | 1/2001 | Urbanke et al. |
| 6,191,710 | B1 | 2/2001 | Waletzki |
| 6,240,463 | B1 | 5/2001 | Benmohamed et al. |
| 6,295,541 | B1 | 9/2001 | Bodnar et al. |
| 6,308,148 | B1 | 10/2001 | Bruins et al. |
| 6,311,260 | B1 | 10/2001 | Stone et al. |
| 6,339,616 | B1 | 1/2002 | Kovalev |
| 6,374,266 | B1 | 4/2002 | Shnelvar |
| 6,434,191 | B1 | 8/2002 | Agrawal et al. |
| 6,434,641 | B1 | 8/2002 | Haupt et al. |
| 6,434,662 | B1 | 8/2002 | Greene et al. |
| 6,438,664 | B1 | 8/2002 | McGrath et al. |
| 6,452,915 | B1 | 9/2002 | Jorgensen |
| 6,463,001 | B1 | 10/2002 | Williams |
| 6,489,902 | B2 | 12/2002 | Heath |
| 6,493,698 | B1 | 12/2002 | Beylin |
| 6,570,511 | B1 | 5/2003 | Cooper |
| 6,587,985 | B1 | 7/2003 | Fukushima et al. |
| 6,614,368 | B1 | 9/2003 | Cooper |
| 6,618,397 | B1 | 9/2003 | Huang |
| 6,633,953 | B2 | 10/2003 | Stark |
| 6,643,259 | B1 | 11/2003 | Borella et al. |
| 6,650,644 | B1 | 11/2003 | Colley et al. |
| 6,653,954 | B2 | 11/2003 | Rijavec |
| 6,667,700 | B1 | 12/2003 | McCanne et al. |
| 6,674,769 | B1 | 1/2004 | Viswanath |
| 6,718,361 | B1 | 4/2004 | Basani et al. |
| 6,728,840 | B1 | 4/2004 | Shatil et al. |
| 6,738,379 | B1 | 5/2004 | Balazinski et al. |
| 6,754,181 | B1 | 6/2004 | Elliott et al. |
| 6,769,048 | B2 | 7/2004 | Goldberg et al. |
| 6,791,945 | B1 | 9/2004 | Levenson et al. |
| 6,823,470 | B2 | 11/2004 | Smith et al. |
| 6,839,346 | B1 | 1/2005 | Kametani |
| 6,842,424 | B1 | 1/2005 | Key et al. |
| 6,856,651 | B2 | 2/2005 | Singh |
| 6,859,842 | B1 | 2/2005 | Nakamichi et al. |
| 6,862,602 | B2 | 3/2005 | Guha |
| 6,910,106 | B2 | 6/2005 | Sechrest et al. |
| 6,963,980 | B1 | 11/2005 | Mattsson |
| 6,968,374 | B2 | 11/2005 | Lemieux et al. |
| 6,978,384 | B1 | 12/2005 | Milliken |
| 7,007,044 | B1 | 2/2006 | Rafert et al. |
| 7,020,750 | B2 | 3/2006 | Thiyagaranjan et al. |
| 7,035,214 | B1 | 4/2006 | Seddigh et al. |
| 7,047,281 | B1 | 5/2006 | Kausik |
| 7,069,268 | B1 | 6/2006 | Burns et al. |
| 7,069,342 | B1 | 6/2006 | Biederman |
| 7,110,407 | B1 | 9/2006 | Khanna |
| 7,111,005 | B1 | 9/2006 | Wessman |
| 7,113,962 | B1 | 9/2006 | Kee et al. |
| 7,120,666 | B2 | 10/2006 | McCanne et al. |
| 7,145,889 | B1 | 12/2006 | Zhang et al. |
| 7,149,953 | B2 | 12/2006 | Cameron et al. |
| 7,177,295 | B1 | 2/2007 | Sholander et al. |
| 7,197,597 | B1 | 3/2007 | Scheid et al. |
| 7,200,847 | B2 | 4/2007 | Straube et al. |
| 7,215,667 | B1 | 5/2007 | Davis |
| 7,216,283 | B2 | 5/2007 | Shen et al. |
| 7,242,681 | B1 | 7/2007 | Van Bokkelen et al. |
| 7,243,094 | B2 | 7/2007 | Tabellion et al. |
| 7,249,309 | B2 | 7/2007 | Glaise et al. |
| 7,266,645 | B2 | 9/2007 | Garg et al. |
| 7,278,016 | B1 | 10/2007 | Detrick et al. |
| 7,318,100 | B2 | 1/2008 | Demmer et al. |
| 7,359,393 | B1 * | 4/2008 | Nalawade ............ H04L 45/02 370/401 |
| 7,366,829 | B1 | 4/2008 | Luttrell et al. |
| 7,380,006 | B2 | 5/2008 | Srinivas et al. |
| 7,383,329 | B2 | 6/2008 | Erickson |
| 7,383,348 | B2 | 6/2008 | Seki et al. |
| 7,388,844 | B1 | 6/2008 | Brown et al. |
| 7,389,357 | B2 | 6/2008 | Duffie, III et al. |
| 7,389,393 | B1 | 6/2008 | Karr et al. |
| 7,417,570 | B2 | 8/2008 | Srinivasan et al. |
| 7,417,991 | B1 | 8/2008 | Crawford et al. |
| 7,420,992 | B1 | 9/2008 | Fang et al. |
| 7,428,573 | B2 | 9/2008 | McCanne et al. |
| 7,441,039 | B2 | 10/2008 | Bhardwaj |
| 7,451,237 | B2 | 11/2008 | Takekawa et al. |
| 7,453,379 | B2 | 11/2008 | Plamondon |
| 7,454,443 | B2 | 11/2008 | Ram et al. |
| 7,457,315 | B1 | 11/2008 | Smith |
| 7,460,473 | B1 | 12/2008 | Kodama et al. |
| 7,471,629 | B2 | 12/2008 | Melpignano |
| 7,496,659 | B1 | 2/2009 | Coverdill et al. |
| 7,532,134 | B2 | 5/2009 | Samuels et al. |
| 7,555,484 | B2 | 6/2009 | Kulkarni et al. |
| 7,571,343 | B1 | 8/2009 | Xiang et al. |
| 7,571,344 | B2 | 8/2009 | Hughes et al. |
| 7,587,401 | B2 | 9/2009 | Yeo et al. |
| 7,596,802 | B2 | 9/2009 | Border et al. |
| 7,617,436 | B2 | 11/2009 | Wenger et al. |
| 7,619,545 | B2 | 11/2009 | Samuels et al. |
| 7,620,870 | B2 | 11/2009 | Srinivasan et al. |
| 7,624,333 | B2 | 11/2009 | Langner |
| 7,624,446 | B1 | 11/2009 | Wilhelm |
| 7,630,295 | B2 | 12/2009 | Hughes et al. |
| 7,633,942 | B2 | 12/2009 | Bearden et al. |
| 7,639,700 | B1 | 12/2009 | Nabhan et al. |
| 7,643,426 | B1 | 1/2010 | Lee et al. |
| 7,644,230 | B1 | 1/2010 | Hughes et al. |
| 7,676,554 | B1 | 3/2010 | Malmskog et al. |
| 7,698,431 | B1 | 4/2010 | Hughes |
| 7,702,843 | B1 | 4/2010 | Chen et al. |
| 7,714,747 | B2 | 5/2010 | Fallon |
| 7,746,781 | B1 | 6/2010 | Xiang |
| 7,764,606 | B1 | 7/2010 | Ferguson et al. |
| 7,793,193 | B2 | 9/2010 | Koch et al. |
| 7,810,155 | B1 | 10/2010 | Ravi |
| 7,826,798 | B2 | 11/2010 | Stephens et al. |
| 7,827,237 | B2 | 11/2010 | Plamondon |
| 7,849,134 | B2 | 12/2010 | McCanne et al. |
| 7,853,699 | B2 | 12/2010 | Wu et al. |
| 7,873,786 | B1 | 1/2011 | Singh et al. |
| 7,917,599 | B1 | 3/2011 | Gopalan et al. |
| 7,924,795 | B2 | 4/2011 | Wan et al. |
| 7,925,711 | B1 | 4/2011 | Gopalan et al. |
| 7,941,606 | B1 | 5/2011 | Pullela et al. |
| 7,945,736 | B2 | 5/2011 | Hughes et al. |
| 7,948,921 | B1 | 5/2011 | Hughes et al. |
| 7,953,869 | B2 | 5/2011 | Demmer et al. |
| 7,957,307 | B2 | 6/2011 | Qiu et al. |
| 7,970,898 | B2 | 6/2011 | Clubb et al. |
| 7,975,018 | B2 | 7/2011 | Unrau et al. |
| 7,996,747 | B2 | 8/2011 | Dell et al. |
| 8,046,667 | B2 | 10/2011 | Boyce |
| 8,069,225 | B2 | 11/2011 | McCanne et al. |
| 8,072,985 | B2 | 12/2011 | Golan et al. |
| 8,090,027 | B2 | 1/2012 | Schneider |
| 8,090,805 | B1 | 1/2012 | Chawla et al. |

(56) References Cited

U.S. PATENT DOCUMENTS

| | | | |
|---|---|---|---|
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |
| 8,565,118 B2 | 10/2013 | Shukla et al. |
| 8,570,869 B2 | 10/2013 | Ojala et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 8,954,491 B1 * | 2/2015 | Medved .............. H04L 41/0836 |
| | | 709/203 |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 * | 8/2015 | Wang ..................... H04L 41/12 |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,091,172 B1 | 10/2018 | Hughes |
| 10,164,861 B2 | 12/2018 | Hughes et al. |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,637,721 B2 | 4/2020 | Hughes et al. |
| 10,719,588 B2 | 7/2020 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck et al. |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0048785 A1 | 3/2003 | Calvignac et al. |
| 2003/0067940 A1 | 4/2003 | Edholm |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Mello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1 | 3/2005 | Savchuk |
| 2005/0071453 A1 | 3/2005 | Ellis et al. |

(56) References Cited

U.S. PATENT DOCUMENTS

| | | |
|---|---|---|
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0188106 A1* | 8/2005 | Pirbhai .................. H04L 45/00 709/238 |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | DuRee |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Vadakital et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1* | 8/2006 | Naseh .................. H04L 45/04 370/216 |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0160200 A1 | 7/2007 | Ishikawa et al. |
| 2007/0174428 A1 | 7/2007 | Lev Ran et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1* | 11/2007 | Mirtorabi ................ H04L 45/02 709/238 |
| 2007/0263548 A1* | 11/2007 | Oguchi .................. H04L 45/02 370/248 |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar |
| 2009/0175172 A1 | 7/2009 | Prytz et al. |
| 2009/0182864 A1 | 7/2009 | Khan et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | van der Linden et al. |
| 2011/0113472 A1 | 5/2011 | Fung et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |

(56) References Cited

U.S. PATENT DOCUMENTS

| | | |
|---|---|---|
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez Fuentes et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0166440 A1* | 6/2013 | Aguilar ............... H04L 12/5601 705/39 |
| 2013/0250951 A1 | 9/2013 | Koganti |
| 2013/0263125 A1 | 10/2013 | Shamsee et al. |
| 2013/0266007 A1* | 10/2013 | Kumbhare ............... H04L 45/56 370/389 |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van Der Linden et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0241352 A1* | 8/2014 | Kollipara ............... H04L 45/507 370/390 |
| 2014/0269705 A1 | 9/2014 | DeCusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le Scouarnec et al. |
| 2015/0127701 A1 | 5/2015 | Chu et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0312134 A1* | 10/2015 | Kapadia ............... H04L 45/02 370/256 |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1* | 4/2016 | Li ............... H04L 12/462 709/220 |
| 2016/0142310 A1* | 5/2016 | Means ............... H04L 45/74 370/392 |
| 2016/0218947 A1 | 7/2016 | Hughes et al. |
| 2016/0218964 A1* | 7/2016 | Liljenstolpe ............ H04L 45/56 |
| 2016/0255000 A1* | 9/2016 | Gattani ............... H04L 45/7453 370/254 |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0279705 A1* | 9/2017 | Lin ............... H04L 45/72 |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1* | 8/2019 | Wu ............... H04L 49/90 |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |
| 2021/0243225 A1* | 8/2021 | Smith ............... H04L 63/20 |

OTHER PUBLICATIONS

RFC 4360, "BGP Extended Communities Attribute", Internet Engineering Task Force (IETF), 12 Pages. (Year: 2006).*

"IPsec Anti-Replay Window: Expanding and Disabling," Cisco IOS Security Configuration Guide. 2005-2006 Cisco Systems, Inc. Last updated: Sep. 12, 2006, 14 pages.

Singh et al.; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, <http://www.lancache.com/slcdata.htm>, 8 pages.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE, pp. 101-114.

You, L. L. and Karamanolis, C. 2004. "Evaluation of efficient archival storage techniques", In Proceedings of the 21st IEEE Symposium on Mass Storage Systems and Technologies (MSST), pp. 1-6.

Douglis, F. et al., "Application specific Delta-encoding via Resemblance Detection", Published in the 2003 USENIX Annual Technical Conference, pp. 1-14.

You, L. L. et al., "Deep Store An Archival Storage System Architecture" Data Engineering, 2005. ICDE 2005. Proceedings of the 21st Intl. Conf. on Data Eng.,Tokyo, Japan, Apr. 5-8, 2005, pp. 12.

Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference, pp. 1-10.

Knutsson, Bjorn et al., "Transparent Proxy Signalling", Journal of Communications and Networks, vol. 3, No. 2, Jun. 2001, pp. 164-174.

Mewton, "Newton's Telecom Dictionary", 17th Ed., 2001, pp. 38, 201, and 714.

(56) References Cited

OTHER PUBLICATIONS

Silver Peak Systems, "The Benefits of Byte-level WAN Deduplication" (2008), pp. 1-4.
"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls"" (available at http://www.businesswire.com/news/home/20050919005450/en/Silver-Peak-Systems-Delivers-Family-Appliances-Enterprise-Wide#.UVzkPk7u-1 (last visited Aug. 8, 2014)), 4 pages."
Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)), 4 pages.
Tseng, Josh, "When accelerating secure traffic is not secure" (available at http://www.riverbed.com/blogs/whenaccelerati.html?&isSearch=true&pageSize=3&page=2 (last visited Aug. 8, 2014)), 3 pages.
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.
Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)), 2 pages.
Final Written Decision, dated Dec. 30, 2014, Inter Partes Review Case No. IPR2013-00403, pp. 1-38.
Final Written Decision, dated Dec. 30, 2014, Inter Partes Review Case No. IPR2013-00402, pp. 1-37.
Final Written Decision, dated Jun. 9, 2015, Inter Partes Review Case No. IPR2014-00245, pp. 1-40.
"Notice of Entry of Judgement Accompanied by Opinion", United States Court of Appeals for the Federal Circuit, Case 15-2072, Oct. 24, 2017, 6 pages.
"Decision Granting Motion to Terminate", Inter Partes Review Case No. IPR2014-00245, Feb. 7, 2018, 4 pages.

* cited by examiner

| Route Source Type | BGP Community |
|---|---|
| LOCAL_SUB | 100 |
| SHARED_SUB | 200 |
| BGP_PE | 300 |
| BGP_BRANCH | 400 |
| BGP_TRANSIT | 500 |
| REMOTE_BGP | 600 |
| REMOTE_BGP_TRANSIT | 700 |
| OTHER | 800 |

FIG. 5

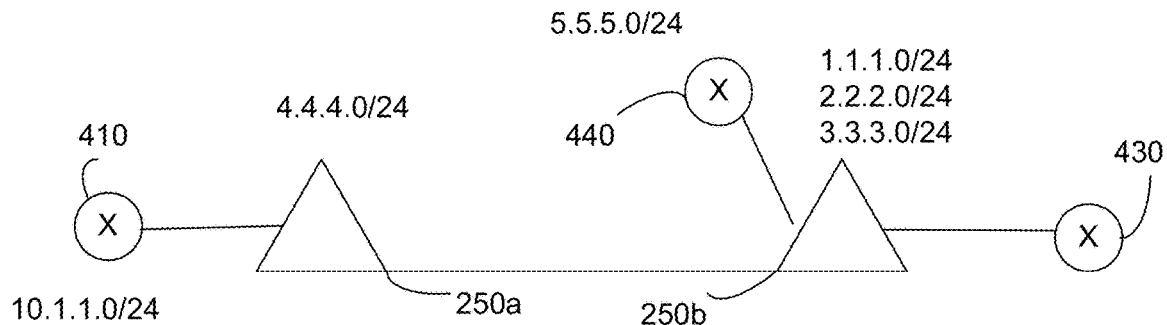

FIG. 6A

Appliance 250b Route Table Manager

| IP Subnet | Route Type | BGP Comm. |
|---|---|---|
| 1.1.1.0/24 | LOCAL_SUB | 100 |
| 2.2.2.0/24 | LOCAL_SUB | 100 |
| 3.3.3.0/24 | LOCAL_SUB | 100 |
| 4.4.4.0/24 | SHARED_SUB | 200 |
| 5.5.5.0/24 | BGP_BRANCH | 400 |
| 10.1.1.0/24 | REMOTE_BGP | 600 |

FIG. 6B

Appliance 250b Route Maps

| Neighbor | Permissions |
|---|---|
| 440 | Permit communities 100 and 200 |

| Neighbor | Permissions |
|---|---|
| 430 | Permit communities 100, 200, and 400 |

FIG. 6D

Appliance 250a Route Table Manager

| IP Subnet | Route Type | BGP Comm. |
|---|---|---|
| 1.1.1.0/24 | SHARED_SUB | 200 |
| 2.2.2.0/24 | SHARED_SUB | 200 |
| 3.3.3.0/24 | SHARED_SUB | 200 |
| 4.4.4.0/24 | LOCAL_SUB | 100 |
| 5.5.5.0/24 | REMOTE_BGP | 600 |
| 10.1.1.0/24 | BGP_BRANCH | 400 |

FIG. 6C

Appliance 250a Route Maps

| Neighbor | Permissions |
|---|---|
| 410 | Permit communities 100, 200, and 400 |

FIG. 6E

Update Neighbor

| | |
|---|---|
| Peer IP | 10.12.133.254 |
| Peer ASN | 201 |
| Enable Imports | ☑ |
| Peer Type | Branch ▼ |
| Admin Status | ☑ |
| Local Preference | 0 |
| MED | 501 |
| AS Prepend Count | 0 |
| KA Timer | 30 |
| Hold Timer | 90 |

Route Export Policies for *branch*      Restore Defaults

1. Locally configured ☑
2. Learned via subnet sharing ☑
3. Learned from a local BGP branch peer ☑
4. Learned from a local BGP branch-transit peer ☑
5. Learned from a local BGP PE router ☑
6. Remote BGP ☑
   *(learned via subnet sharing, but originally from a BGP peer)*
7. Remote BGP branch-transit peer ☑
   *(learned via subnet sharing, but originally a BGP-transit peer)*

Enable MD5 Password ☐
    Password
    Confirm Password

[Update] [Close]

```
┌─────────────────────────────────────────────┐
│ GET INPUT DENOTING SOURCE TYPES THAT CAN BE │
│ ADVERTISED TO CERTAIN AS AND/OR BORDER ROUTER│
│                     910                     │
└─────────────────────────────────────────────┘
                      │
                      ▼
┌─────────────────────────────────────────────┐
│ FOR EACH RECEIVED SOURCE TYPE ASSIGN DO     │
│ ADVERTISE RULE TO CORRESPONDING BGP COMMUNITY│
│                     920                     │
└─────────────────────────────────────────────┘
                      │
                      ▼
┌─────────────────────────────────────────────┐
│ GENERATE LIST OF ROUTES USING ADDRESS PREFIXES IN │
│ BGP COMMUNITIES HAVING DO ADVERTISE RULE    │
│                     930                     │
└─────────────────────────────────────────────┘
                      │
                      ▼
┌─────────────────────────────────────────────┐
│     PROVIDE LIST OF ROUTES TO CERTAIN       │
│         AS AND/OR BORDER ROUTER             │
│                     940                     │
└─────────────────────────────────────────────┘
```

FIG. 9

SELECTIVE ROUTE EXPORTING USING SOURCE TYPE

TECHNICAL FIELD

The present technology relates generally to network communications, and more specifically to route exporting between network devices.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Typically, data is sent between computing devices across a communications network in packets. The packets may be generated according to a variety of protocols such as Transmission Control Protocol (TCP), User Datagram Protocol (UDP), or the like. A network appliance in a network can be connected to many other computing devices via many different network paths. Further the network paths may traverse multiple communication networks.

A group of network appliances may be in communication with other appliances within a cloud, or with external computing devices, such as routers. Often times it may be preferable to only selectively share IP address subnets associated with a particular network appliance with specific connecting computing devices. Thus, information regarding the type of connected device to an appliance is relevant for controlling IP address subnet sharing.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In an exemplary computer-implemented method for selectively advertising routing information by a network appliance to a neighboring computing device, the method comprises: receiving at a first appliance of a plurality of appliances, routing information from a first source of a plurality of sources, the routing information comprising at least one IP address; determining a source type of the first source, the source type being from a plurality of source types; identifying a community identifier corresponding to the determined source type; associating the received routing information with the identified community identifier; receiving a selection from a customizable export map regarding permitted communities to export from the first appliance to a second source of the plurality of sources; matching the permitted communities to the identified community identifier; and exporting by the first appliance, the routing information for the matched communities to the second source.

Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which:

FIG. 5 illustrates exemplary community identifiers associated with each route source type.

FIG. 6A illustrates an exemplary environment of appliances in communication with routers.

FIGS. 6B and 6C illustrate exemplary route tables for an appliance.

FIGS. 6D and 6E illustrate exemplary route maps for an appliance.

FIG. 7 illustrates an exemplary screenshot of a user interface of a network administrator of an appliance.

FIG. 9 is another exemplary process flowchart performed by a network appliance.

DETAILED DESCRIPTION

Figure 1:
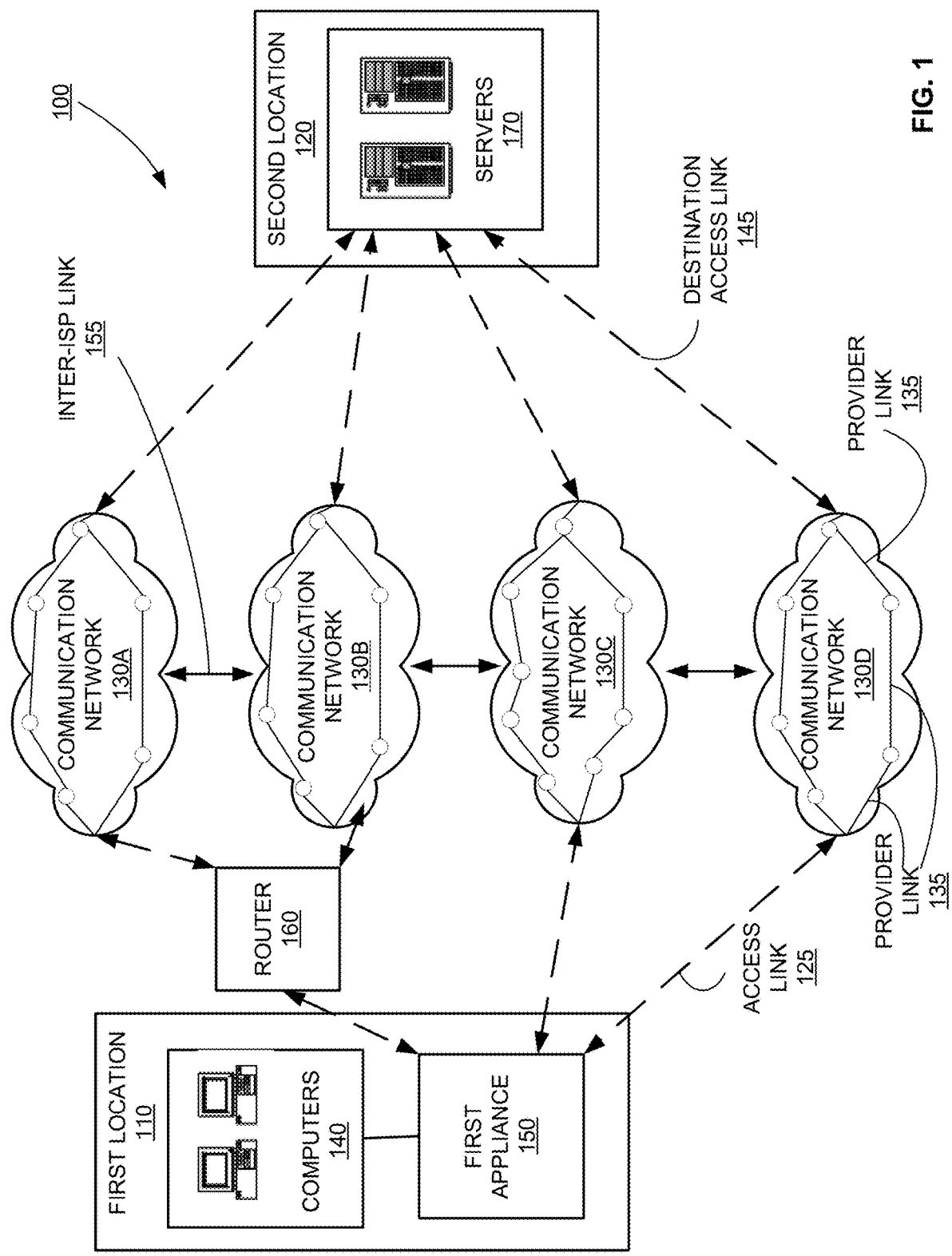
FIG. 1 illustrates an exemplary system, within which the present disclosure can be implemented.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The embodiments described herein relate to mechanisms for selectively advertising routing information by a network appliance to one or more neighboring computing devices.

FIG. 1 illustrates an exemplary system 100, within which the present disclosure can be implemented. The exemplary system 100 includes a first location 110, a second location 120, and communication networks 130A-130D. While four communication networks are depicted in exemplary system 100, there can be any number of communication networks, including just one. Additionally, system 100 can include many locations, though only two are depicted in the exemplary figure for simplicity.

In the exemplary embodiment depicted in FIG. 1, the first location 110 includes computers 140 and a first appliance 150. In the first location 110, the computers 140 are communicatively coupled to the first appliance 150. While only one appliance is depicted in first location 110, there can be multiple appliances, physical and/or virtual, at first location 110. In some embodiments, the first location is a branch location of an enterprise. While not depicted here, first location 110 can also comprise additional elements such as routers, switches, or any other physical or virtual computing equipment.

Computers 140 may be any type of computing device capable of accessing a communication network, such as a desktop computer, laptop computer, server, mobile phone, tablet, or any other "smart" device.

The first appliance 150 comprises hardware and/or software elements configured to receive data and optionally perform any type of processing of the data before transmitting it across a communication network.

As illustrated, the first appliance 150 is configured in-line (or serially) between the computers 140 and the router 160. The first appliance 150 intercepts network traffic between the computers 140 and the servers 170, in either direction.

In other embodiments, the first appliance 150 can be configured as an additional router, gateway, bridge, or be transparent on some or all interfaces. As a router, for example, the first appliance 150 appears to the computers 140 as an extra hop before the router 160. In some embodiments, the first appliance 150 provides redundant routing or peer routing with the router 160. Additionally, the first appliance 150 may provide failure mechanisms, such as, fail-to-open (e.g., no data access) or fail-to-wire (e.g., a direct connection to the router 160). If an appliance has multiple interfaces, it can be transparent on some interfaces, or act like a router, or act like a bridge on others. Alternatively, the appliance can be transparent on all interfaces, or appear as a router or bridge on all interfaces.

In FIG. 1, the first appliance 150 is communicatively coupled to a router 160, which is coupled to communication networks 130A and 130B. While only one router 160 is depicted in exemplary system 100, there can be multiple routers, switches, or other equipment (physical or virtual) present in system 100, either within the first location 110 or outside of the first location 110. Typically, router 160 would be located within first location 110. In various embodiments, first appliance 150 may be in communication with communication networks 130C and 130D directly (on separate interfaces), instead of through router 160. While router 160 is depicted as being connected to two communication networks and first appliance 150 is also depicted as being connected to two communication networks, a person of ordinary skill in the art would understand that there can be any number of communication networks (including just one communication network) connected to the first location 110, either via router 160, via first appliance 150, or via another computing device. To illustrate that each of the access links is possible but not required in every embodiment, the access links 125 are shown as dashed lines in FIG. 1.

The second location 120 in exemplary system 100 includes servers 170. While the term "server" is used herein, any type of computing device may be used in second location 120, as understood by a person of ordinary skill in the art. The server may also be a virtual machine. While not depicted in FIG. 1, second location 120 can optionally include at least one second appliance in addition to, or instead of, servers 170. Second location 120 can also include other components not depicted in FIG. 1, such as routers, switches, load-balancers or any other physical or virtual computing equipment. In some embodiments, the second location 120 is a central location or data center for an enterprise. In other embodiments, the second location 120 is a data center hosting a public web service or application.

The servers 170 are depicted in FIG. 1 as being communicatively coupled to the communication networks 130A-130D via destination access links 145. In some embodiments, servers 170 may actually be in communication with the one or more of the communication networks through a router, switch, second appliance, or other physical or virtual equipment. Further, while four destination access links 145 are depicted in FIG. 1, corresponding to each of the four communication networks (130A-130D), there may actually be fewer (such as just one) or more communication networks connected to second location 120. To illustrate that each of the destination access links 145 is possible but not required in every embodiment, the destination access links 145 are shown as dashed lines in FIG. 1.

The communication networks 130A-130D comprise hardware and/or software elements that enable the exchange of information (e.g., voice, video and data) between the first location 110 and the second location 120. Some examples of the communication networks 130A-130D are a private wide-area network (WAN), the public Internet, Multiprotocol Label Switching (MPLS) network, and wireless LTE network. Typically connections from the first location 110 to the communication networks 130A-130D (e.g., from router 160 and first appliance 150) are T1 lines (1.544 Mbps), or broadband connections such as digital subscriber lines (DSL) and cable modems. Other examples are MPLS lines, T3 lines (43.232 Mbps), OC3 (155 Mbps), OC48 (2.5 Gbps), fiber optic cables, or LTE wireless access connection. In various embodiments, each of the communication networks 130A-130D may be connected to at least one other communication network via at least one Inter-ISP link 155. For example, communication network 130A may be connected to communication network 130B, 130C, and/or 130D via one or more inter-ISP links. Data may traverse more than one communications network along a path from first location 110 to second location 120. For example, traffic may flow from the first location 110 to communication network 130A, over inter-ISP link 155 to communication network 130B, and then to the second location 120.

The router 160 and first appliance 150 are optionally connected to the communication networks 130A-130D via access links 125, sometimes also referred to herein as network access links. The communication networks 130A-130D consist of routers, switches, and other internal components that make up provider links 135. The provider links 135 are managed by the network service providers such as an Internet Service Provider (ISP). The second location 120 can be connected to communication networks 130A-130D via destination access links 145. Access links 125, provider links 135, and destination access links 145 can be combined to make various network paths along which data travels between the first location 110 and the second location 120. The exemplary embodiment of FIG. 1 depicts two paths along various provider links 135 through each communication network. However, as understood by persons of ordinary skill in the art, there can be any number of network paths across one or more communication networks.

In addition, communication networks may be in communication with one another via inter-ISP link(s) 155. For example, data traveling through communication network 130A may also travel through communication network 130C before reaching second location 120. In various embodiments, data can travel through any one or more of the communication networks 130A-130D from first location 110 to second location 120, and vice versa. Generally, an inter-ISP link connects communication networks of different internet service providers, such as a link connecting Verizon LTE wireless network with Comcast broadband network. In some embodiments, an inter-ISP link can connect communication networks from the same internet service provider, such as a link connecting Verizon LTE wireless network with the Verizon Fire network.

The first appliance 150, along with any other appliances in system 100 can be physical or virtual. In the exemplary embodiment of a virtual appliance, it can be in a virtual private cloud (VPC), managed by a cloud service provider, such as Amazon Web Services, or others. An appliance in a customer data center can be physical or virtual. Similarly, the second location 120 may be a cloud service such as Amazon Web Service, Salesforce, or others.

As discussed herein, the communication networks 130A-130D can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across an underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information can be transmitted by first appliance 150 over one or more communication networks 130A-130D to second location 120. In some embodiments, voice, video, and data may be received and transmitted on separate LAN or vLAN interfaces, and first appliance 150 can distinguish the traffic based on the LAN/vLAN interface at which the data was received.

In some embodiments, the system 100 includes one or more secure tunnels between the first appliance 150 and servers 170, or optionally a second appliance at the second location. The secure tunnel may be utilized with encryption (e.g., IPsec), access control lists (ACLs), compression (such as header and payload compression), fragmentation/coalescing optimizations, and/or error detection and correction provided by an appliance.

In various embodiments, first location 110 and/or second location 120 can be a branch location, central location, private cloud network, data center, or any other type of location. In addition, multiple locations can be in communication with each other. As understood by persons of ordinary skill in the art, any type of network topology may be used.

The principles discussed herein are equally applicable to multiple first locations (not shown) and to multiple second locations (not shown). For example, the system 100 may include multiple branch locations and/or multiple central locations coupled to one or more communication networks. System 100 may also include many sites (first locations) in communication with many different public web services (second locations). Branch location/branch location communication, central location/central location communication, central location/cloud appliance communication, as well as multi-appliance and/or multi-node communication and bi-directional communication are further within the scope of the disclosure. However, for the sake of simplicity, FIG. 1 illustrates the system 100 having a single first location 110 and a single second location 120.

Figure 2:
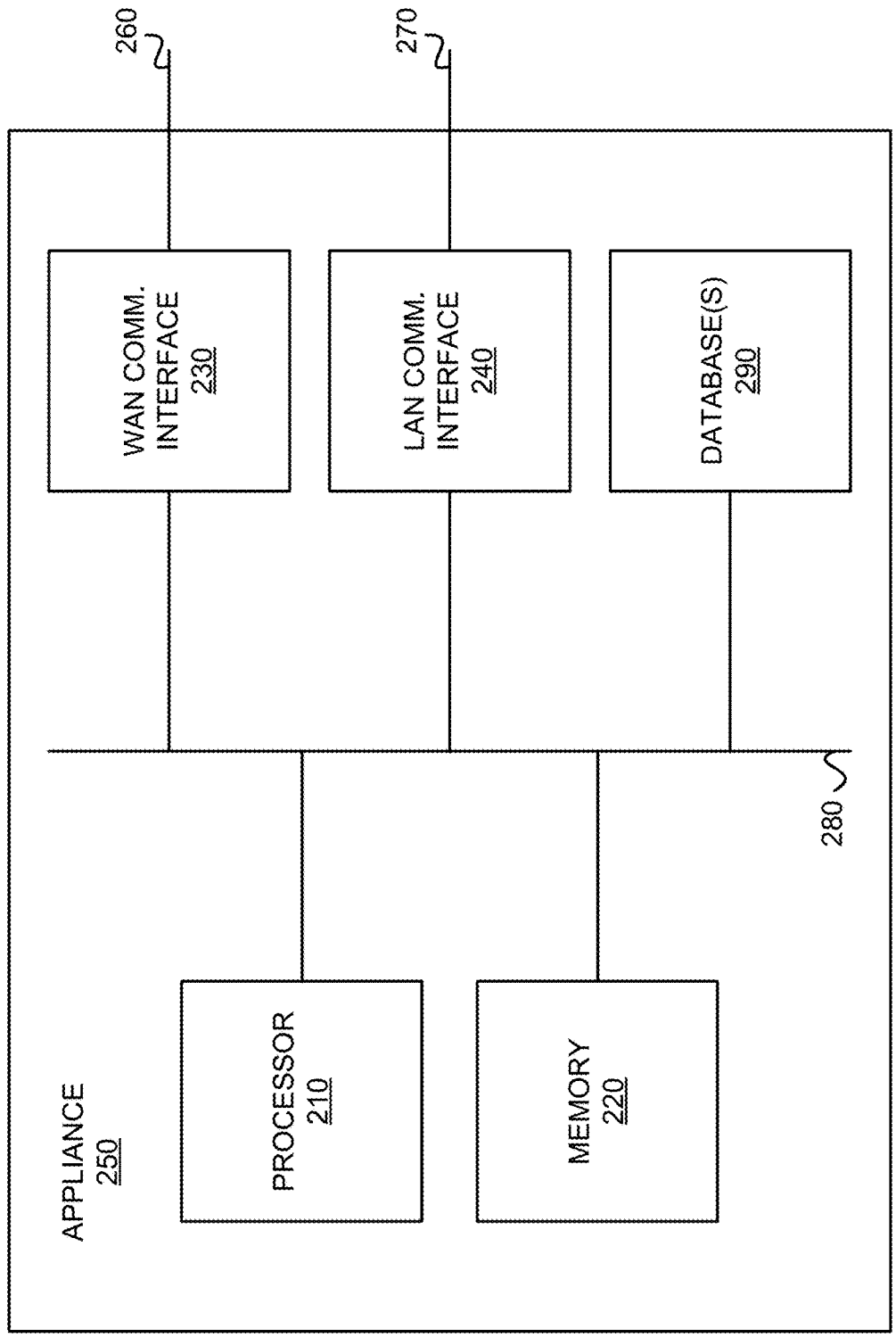
FIG. 2 illustrates a block diagram of an appliance, in an exemplary implementation of the invention.

FIG. 2 illustrates a block diagram of an appliance 250 (also referred to herein as network appliance), in an exemplary implementation of the invention. The appliance 250 includes a processor 210, a memory 220, a WAN communication interface 230, a LAN communication interface 240, and database(s) 290. A system bus 280 links the processor 210, the memory 220, the WAN communication interface 230, the LAN communication interface 240, and the database(s) 290. When deployed in a branch location, line 260 links the WAN communication interface 230 to the router 160 (in FIG. 1), and line 270 links the LAN communication interface 240 to the computers 140 in FIG. 1.

The database(s) 290 comprises hardware and/or software elements configured to store data in an organized format to allow the processor 210 to create, modify, and retrieve the data. The hardware and/or software elements of the database(s) 290 may include storage devices, such as RAM, hard drives, optical drives, flash memory, and magnetic tape. While the term database is used herein, a person of ordinary skill in the art would understand that any similar type of mechanism for storing data in an organized format can be utilized.

In some embodiments, some appliances comprise identical hardware and/or software elements. Alternatively, in other embodiments, some appliances, such as a second appliance, may include hardware and/or software elements providing additional processing, communication, and/or storage capacity capabilities.

Embodiments of the present invention also allow for centrally assigned policies to be implemented throughout an enterprise network, to secure and control all WAN traffic for the enterprise. Software defined WAN (SD-WAN) overlay networks can be created independently from the physical network, and from each other, and in multiple layers. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 3:
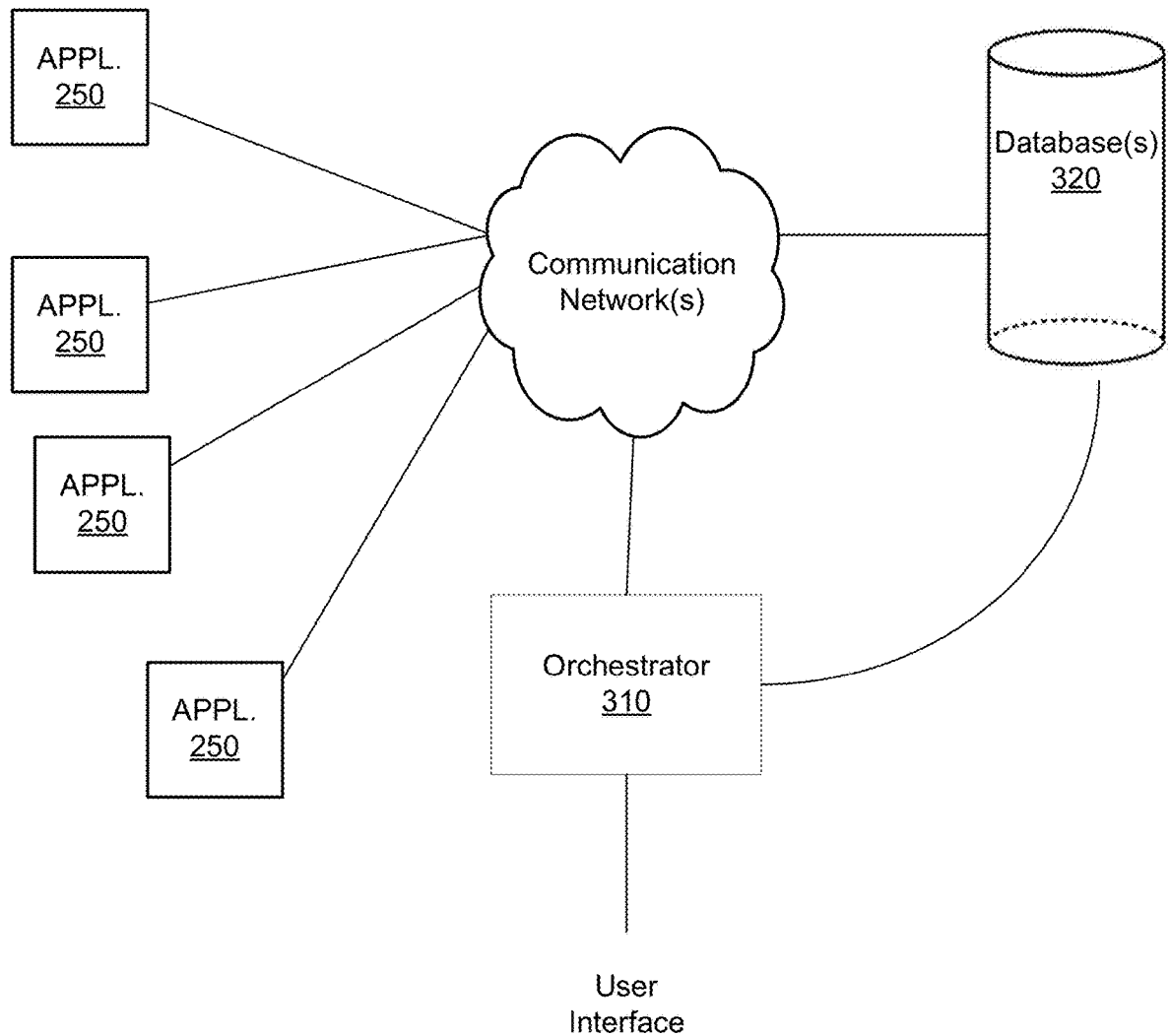
FIG. 3 illustrates an exemplary schematic of appliances in communication with an orchestrator device.

All of the overlay networks, policies, and corresponding ports, subnets and vLANs can be maintained in one or more databases in communication with an orchestrator device, as depicted in FIG. 3. The orchestrator 310 can be hardware and/or software, and be in communication with each of the networked devices, such as the network appliances, as well as in communication with the database(s) 320.

Further, while not depicted in FIG. 3, each of the appliances can be in communication with one another in any topology configuration, such as a mesh network. In one embodiment, each appliance 250 can be in communication via a full mesh network. The appliances together may form one or more cloud networks for an enterprise.

In exemplary embodiments, the orchestrator 310 may maintain information regarding the configuration of each appliance at each location (physical or virtual). In this way, the orchestrator 310 can create, manage and implement policies for network traffic throughout the network of connected devices. For example, if a higher priority is designated for voice traffic, the orchestrator 310 can automatically configure the corresponding network appliances at all relevant locations accordingly.

By having knowledge of the configuration of each appliance in the network, the orchestrator 310 can also create and manage tunnels in the enterprise network, including tunnels to carry a particular type of network traffic between each source-destination appliance pair. The orchestrator 310 can automatically configure the enterprise network by determining which tunnels need to be created, and automatically creating them based on the network nodes and overlays. The orchestrator 310 can also configure policies based on application classification techniques to preferentially steer certain types of applications over one path rather than over another path.

Figure 4:
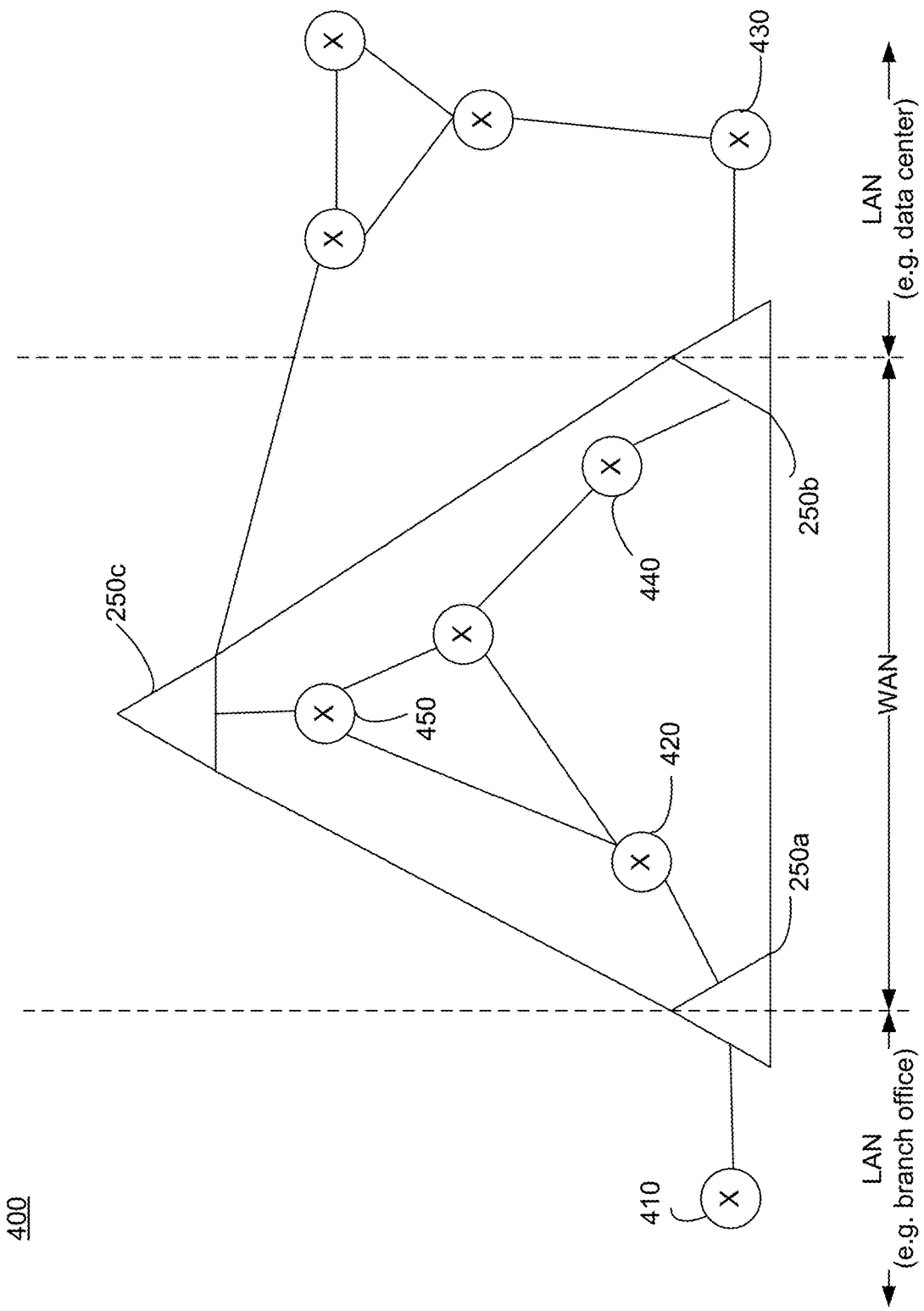
FIG. 4 illustrates an exemplary environment in which a plurality of appliances is in communication with various internal and external routers.

FIG. 4 illustrates an exemplary environment 400 in which a plurality of appliances are in communication with various internal and external routers. As shown in FIG. 4, appliances 250*a*, 250*b*, and 250*c* are communicatively coupled to one another, either directly or indirectly through other intermediate computing devices. While only three appliances are depicted in FIG. 4, there can be fewer or additional appliances present as well.

In exemplary environment 400, the appliances are depicted as also being communicatively coupled with a number of routers, either directly or indirectly. While not depicted in the figure, there can actually be any number of intermediary switches, routers, or other computing devices between the appliances. In environment 400, router 410 is in communication with appliance 250*a* within a LAN such as a branch office, router 420 is in communication with appliance 250*a* in the broader WAN, and router 430 is in communication with appliance 250*b* within a LAN such as a data center. In various embodiments, each appliance is in communication with one another via a fully meshed network topology, and the appliances together form a cloud network. Traditionally, appliances such as those depicted herein utilize proprietary subnet sharing to communicate with one another and exchange IP addresses and subnets.

Routers such as those depicted in environment 400 traditionally utilize the border gateway protocol (BGP) as a protocol to communicate routing information, including the exchange of IP addresses and subnets. Embodiments of the present disclosure utilize BGP to exchange IP addresses and subnets to communicate routing information between proprietary network appliances and routers typically used as a core part of the communication network. In this way, proprietary network appliances, such as those depicted in environment 400 can learn of IP addresses and subnets from other computing devices and use them.

In exemplary embodiments, each appliance contains a database with a routing table having customizable routing information associated with each neighboring router. That is, appliance 250*a* contains a database with customizable routing information for router 410, router 420, appliance 250*b*, and appliance 250*c*. The routing table may contain information regarding a neighbor type for the appliance. The neighbor type is determined, at least in part, on a location of the router communicating with the particular appliance. Therefore, a particular router may be a different neighbor type to each appliance.

In various embodiments, there may be three exemplary neighbor types designated to each router that communicates with an appliance. As would be understood by a person of ordinary skill in the art, although these three neighbor types are described herein, there can actually be any number of neighbor types for each appliance.

A first exemplary neighbor type to appliance 250*a* may be a branch router, such as router 410 of FIG. 4. In exemplary embodiments, a branch router is a router within an enterprise branch location (such as first location 110 of FIG. 1) that is in communication with the appliance. A second exemplary neighbor type to appliance 250*a* may be a provider edge (PE) router, such as router 420. A PE router can be any router within a communication network in a broader WAN (such as a router in communication networks 130A-130D in FIG. 1). While PE router is discussed herein, the present disclosure also includes other types of routers present in a WAN. Further, a router on the WAN side of an appliance may be assigned a different neighbor type than a router on the LAN side of an appliance. A third exemplary neighbor type to appliance 250*c* is a branch transit router, such as router 430. A branch transit router can be any router connected to a series of appliances, such as appliances 250*b* and 250*c*. That is, appliance 250*a* is not directly connected to router 430, but is rather connected to router 430 via another appliance (appliance 250*b*). A branch transit router, such as router 430 of FIG. 4 is characterized as a "transit" type neighbor because it may have "back-door" connectivity to another appliance. For example, router 430 is depicted as being in communication with appliance 250*b* directly, and also connected to another router that is in communication with appliance 250*c*. Thus, there are two avenues of communication with the network appliances. While these specific neighbor types are discussed here, there can be fewer, additional, or different neighbor types designated by a user.

Many routing vendors use Border Gateway Protocol (BGP) to communicate routing information, such as Internet Protocol (IP) addresses and IP subnets. That is, BGP can be used to exchange IP addresses and subnets between computing devices. For simplicity, IP addresses will be discussed herein; however, a person of ordinary skill in the art would understand that an IP subnet is equally applicable to the present disclosure instead of a singular IP address.

When an appliance is in communication with a router that uses BGP, there may be a need for an appliance to communicate with the neighboring router by sharing IP addresses and subnets back and forth. That is, the appliance may need to export IP addresses to the router, and may also need to import IP addresses from the router. In some circumstances, it may be desirable for an appliance to only export a subset of its known IP addresses to a router or a peer appliance. Also, it may be desirable for an appliance to export a different subnet of IP addresses to different computing devices (such as routers), depending on the type or location of the computing device. Thus, a mechanism is needed to customize and adjust IP address exporting by an appliance to different neighboring computing devices. While the computing devices discussed herein are predominantly appliances and routers, the present disclosure is equally applicable to any device that is present in a network and has an IP address.

When processing an IP subnet as part of control traffic, an appliance may determine an origination location for the IP subnet and assign a source type to that IP subnet based on a classification. By way of non-limiting example, the routes can be classified using their respective IP subnet source as a:

- LOCAL_SUB: local subnet is an subnet owned by the appliance and/or defined by the appliance
- SHARED_SUB: shared subnet that is learned from a peer appliance
- BGP_PE: subnet is received from a BGP provider edge (PE) router using BGP
- BGP_BRANCH: subnet is received from a BGP branch router using BGP, i.e., a branch router being at a physically/geographically remote location from the appliance
- BGP_BRANCH_TRANSIT: BGP branch transit subnet is similar to a BGP branch subnet, with the exception that the source of the subnet is a BGP branch transit peer, and may thus have connectivity to other appliances that are also connected to the local appliance. This type of peer computing device can be in the same Autonomous System (iBGP) or in a different Autonomous System (eBGP).

REMOTE_BGP: a subnet received from a router to another peer appliance and then from the peer appliance to the present appliance; learned via subnet sharing from a peer appliance, but originally from a BGP branch peer REMOTE_BGP_BRANCH_TRANSIT: learned via subnet sharing from a peer appliance, but originally from a BGP transit peer While these specific route source types are discussed herein, there can be fewer or additional source types used for IP addresses imported or exported to other networked computing devices.

In various embodiments, a unique community identifier is attached to each route source type by an appliance (also sometimes referred to herein as "route type" or "source type"). Exemplary community identifiers associated with each route source type are depicted in FIG. 5. The community identifier for each route source type can be implemented as a tag, or string, attached to the route type to identify the community. That is, for a learned IP subnet of 1.1.1.0/24, a community identifier of 200 may be presented as simply 1.1.1.0/24 200. As would be understood by persons of ordinary skill in the art, any string value can be used to represent the community identifier, including 2-byte or 4-byte integer values.

When an appliance such as appliance 250a receives a subnet in a control communication, it first determines where the subnet originated from (i.e. the source of the subnet) and attaches a community identifier to it that corresponds with the route source type. The subnet and community identifier are stored in an internal database within the appliance, usually within a Route Table Manager. In some embodiments, a catchall "other" route source type may be used to categorize IP subnets received from another source not otherwise accounted for. A community identifier can be a 2-byte or 4-byte hard-coded unique identifier that is attached to the learned IP address or subnet.

In embodiments of the present disclosure, each appliance in the network creates a route map for each neighboring device. Permissions are created for each neighbor and maintained in an Address Exporting Route Map, also sometimes referred to herein as simply route map or export map. The Address Exporting Route Map for each neighboring computing device to the particular appliance contains information regarding permitted communities. That is, appliance 250a maintains a route map for router 410 and a route map for router 420. Appliance 250b maintains a route map for router 430 and a route map for router 440. Appliance 250c maintains a route map for router 450. Again, while only these few neighboring devices are described here for simplicity, there can actually be fewer or additional routers or other computing devices present.

In the Address Exporting Route Map or other data structure, each appliance may maintain information about the type of router, the neighbor type for the router (e.g., branch, branch transit, or PE), a source type for each IP subnet, and/or a community identifier for the source type. While these specific fields are discussed herein, there can be fewer or additional fields in any given Address Exporting Route Map.

Each neighboring computing device to each appliance may have its own customizable export policy. For example, appliance 250a may determine that all route source types can be advertised to router 410, but only two of the route source types can be advertised to router 420. In this way, customized routing policies and subnet exporting policies can be configured in a simple manner for each neighboring computing device to appliance 250a.

In an exemplary use case for the environment depicted in FIG. 6A, appliance 250b owns subnets 1.1.1.0/24, 2.2.2.0/24, and 3.3.3.0/24. These subnets are owned by appliance 250b and thus stored in a Route Table Manager within appliance 250b with community identifier 100 for local subnets, as defined in FIG. 5. An exemplary Route Table Manager is depicted in FIG. 6B.

Appliance 250b may also learn of IP subnet 4.4.4.0/24 from appliance 250a, the subnet being owned by appliance 250a. Since this is learned from a peer appliance, it is stored in the exemplary Route Table Manager of FIG. 6B as a shared subnet, and assigned BGP Community identifier 200.

At another time, appliance 250b may also learn of IP subnet 10.1.1.0/24 from appliance 250a but determine that the IP subnet actually originated from router 410. That is, the source of the IP subnet is actually router 410, and the subnet was learned from router 410 to appliance 250a to appliance 250b. For appliance 250b, this subnet was learned from a remote BGP device, and is stored in the table accordingly with a community identifier of 600.

At another time, appliance 250b may learn of IP subnet 5.5.5.0/24 from router 440. Based on the fact that the subnet originated from a BGP device in communication with appliance 250b, the appliance associates it with a BGP_BRANCH route source type and assigns it a BGP community identifier of 400. In this way, known IP addresses or IP subnets at appliance 250b, whether learned from external sources or originating at the device itself, are stored in a Route Table Manager at appliance 250b.

A network administrator can decide which specific IP subnets are enabled for export from appliance 250b to router 430, such that the IP subnets exported to each computing device in communication with appliance 250b can be customized and updated dynamically. That is, certain subnets may be exported to router 430 which is present in a data center, but fewer subnets may be exported to router 440 which is present in the broader WAN. Thus, a customized Address Export Route Map may be created by appliance 250b for each BGP neighbour computing device with route exporting permissions, based on the source of the subnet to be exported.

Exemplary Address Exporting Route Maps, also referred to herein as an export maps or route maps, are depicted in FIG. 6D. The export maps of FIG. 6D can be stored in appliance 250b and have information regarding which IP subnets are permitted to be exported to which neighboring computing device. FIG. 6D shows that appliance 250b has two BGP neighbors (as shown in FIG. 6A)—router 430 and router 440. For the route map associated with router 440, appliance 250b is depicted as being permitted to export subnets associated with community identifiers 100 and 200. For the route map associated with router 430, appliance 250b is depicted as being permitted to export subnets associated with community identifiers 100, 200 and 400. These permissions are determined by a network administrator of appliance 250b, and can be customized for each neighboring device, as well as can be dynamically updated.

In exemplary embodiments there are between 2-4 BGP neighbors for each appliance. However, as would be understood by a person of ordinary skill in the art, there can actually be any number of BGP neighboring devices. Rules can be defined for each BGP neighbor to an appliance regarding which communities are permitted to be exported to that neighboring device by appliance 250b. Further, the rules can be dynamically updated. In this way, custom route filtering can be achieved by a network appliance to a plurality of BGP computing devices based on the source of the route. In an exemplary embodiment, there are up to 20 BGP computing devices in communication with a network appliance, each with their own custom route filtering.

FIG. 6C depicts an example of a Route Table Manager that may be present at appliance 250a. Appliance 250a may know of the same IP subnets as appliance 250b, but the source type is different for each subnet, based on the origin of the subnet in relation to appliance 250a. That is, subnets 1.1.1.0/24, 2.2.2.0/24, and 3.3.3.0/24 are owned by, and learned from, peer appliance 250b, and thus are assigned a route source type of SHARED_SUB. Accordingly, these subnets are assigned BGP community identifiers of 200 for the SHARED_SUB route source type. Subnet 4.4.4.0/24 is now a LOCAL_SUB route source type for appliance 250a since it originated at the appliance itself, and assigned a community identifier of 100. Subnet 5.5.5.0/24 originated from a remote BGP device in relation to appliance 250a, and is assigned a community identifier of 600. Subnet 10.1.1.0/24 originated from a BGP branch device that neighbors appliance 250a, and is assigned a community identifier of 400.

An exemplary Address Exporting Route Map for appliance 250a is depicted in FIG. 6E. The export map of FIG. 6E can be stored in appliance 250a and has information regarding which IP subnets are permitted to be exported to which neighboring computing device. FIG. 6E shows that appliance 250a has one BGP neighbor (as shown in FIG. 6A)—router 410. For router 410, appliance 250a is permitted to export subnets associated with community identifiers 100, 200 and 400. These permissions are determined by a network administrator of appliance 250a, and can be customized for each neighboring device, as well as can be dynamically updated. In this way, each appliance in an enterprise or a network can have customized address exporting for each neighboring BGP device, without having to configure permissions for specific addresses. Rather, customized address exporting can be achieved based simply on a route source type of each address.

Further, while the tables of FIGS. 6B, 6C, 6D and 6E depict these specific columns or fields of information, a person of ordinary skill in the art would understand that there can actually be fewer or additional columns or fields of data stored in the Route Table Manager or the Export Map. In addition, while the information is presented in a table herein for simplicity, the information may actually be stored in a database, node, or any other type of data structure. In various embodiments, the route map is stored in internal memory at the appliance, or at an external location in communication with each appliance.

Initial configuration of a neighboring computing device to an appliance may commence with a customized export map. That is, an appliance can configure a customized export map for each neighboring computing device by designating an export policy regarding which IP addresses or subnets the appliance can share with the neighboring computing device. The export policy designates which route source types are permitted to be exported to the neighboring computing device by the appliance. For example, an exemplary export policy may have 3 rules: permit subnets that match community 100, permit subnets that match community 200, permit subnets that match community 400. Generally, route types not explicitly allowed are automatically excluded. The principles discussed herein are equally applicable to an import policy as well.

Furthermore, a network administrator can configure customized route exporting policies to BGP devices without having knowledge of specific IP address prefixes. This greatly simplifies the process of determining an IP subnet exporting policy from an appliance to a neighboring computing device, such as a BGP router. In particular, a network administrator does not need to create address exporting rules for every BGP computing device. Rather, customized address exporting is achieved by assigning a route source type based on the relationship of the BGP neighbor to the appliance, and the origin of the particular IP subnet. A community is created for each route source type and an identifier is assigned to each community. Address exporting from an appliance to the BGP neighbor occurs in accordance with specific permissions to that BGP neighbor for each community. In this way, customized routing is achieved without configuring specific IP address prefixes for each computing device.

The initial configuration can be accomplished in a streamlined manner by a network administrator or other user of a network appliance, via a user interface. When an appliance begins a network session to connect to a neighboring computing device, such as a router, a network administrator that owns the appliance is presented with a user interface showing the neighboring computing device and the IP address, as depicted in the exemplary screenshot 700 of FIG. 7. The neighbor type of that computing device may be automatically determined by the appliance, or may be set by the network administrator. For example, screenshot 700 depicts a pull-down list of all of the different route source types that are configured for the network. The route source type is allocated for routes received by this neighbor based on where the IP address subnet originated, as discussed herein. The screenshot 700 depicts that the BGP neighbor type is "Branch".

Via the user interface, a network administrator can configure the route export policies for the particular neighbor type, in this example the branch neighbor type, simply by selecting which types of routes are permitted to be exported to branch neighboring computing devices. While there are checkboxes depicted in screenshot 700, any method of selection may be used in the user interface, such as radio buttons, highlighting, or any other method. Also, as depicted in screenshot 700, the route export policies for the peer BGP computing device can be dynamically updated at any time with a few simple clicks on a user interface.

If a network administrator chooses not to configure customized export policies for the BGP neighboring computing device, then a default export routing policy may be implemented by way of a default export map for each neighboring computing device to an appliance. In an exemplary embodiment, for a BGP branch router, all route source types are exported by the appliance to the BGP branch router as a default. For a BGP branch transit router, all branch route source types are exported by the appliance to the router as a default, and transit and remote route source types are not exported. That is, only the LOCAL_SUB, SHARED_SUB, BGP_PE, BGP_BRANCH route source types are exported. This is because a branch transit router can be connected to a second branch location in another way that is not visible to the appliance, and it is desirable to avoid advertising subnets in both directions (outbound and inbound) of the appliance. For a BGP neighboring computing device that is a PE router, the local, branch, and local transit route source types may be exported by the appliance to the PE router as a default. That is, the LOCAL_SUB, SHARED_SUB, BGP_PE, BGP_BRANCH, BGP_TRANSIT route source types are exported to the PE router only.

By utilizing embodiments of the present disclosure, a network administrator of an appliance can easily deploy a proprietary network appliance within a communication network without needing to fully understand route maps or BGP routing access control lists. Further, specific address prefixes do not need to be configured for specific computing devices. Rather, the appliance simply needs to know which route source types that exist in their proprietary enterprise cloud encompassing the appliance are to be advertised to each BGP neighboring device. By developing route exporting policies for each BGP neighboring device, each appliance in a cloud network such as that depicted in FIGS. 1 and 3 can implement a uniform route exporting policy across an enterprise cloud network. Further, customized BGP route filtering can be achieved without creating an access control list. Additionally, a uniform export policy can be maintained throughout an enterprise network, regardless of where an individual network appliance is deployed or physically located.

In an example embodiment for FIG. 6A, appliances 250*a* and 250*b* communicate with one another via proprietary subnet sharing. Router 410 is a BGP neighbor type of branch to appliance 250*a*. When appliance 250*a* learns of subnet 10.1.1.0/24 from router 410, it attaches information to that subnet so that this route source type is carried on as the subnet is shared further within a network. For example, appliance 250*a* may store the subnet in its internal database (such as a route table manager) as 10.1.1.0/24, community 400.

When appliance 250*a* exports this subnet to appliance 250*b* via subnet sharing, appliance 250*b* recognizes that the subnet is from router 410, which is a remote BGP route source type to appliance 250*b*. Thus, appliance 250*b* stores the subnet in its internal database (such as a route table manager) as 10.1.1.0/24, community 600 for remote BGP. In this way, the same subnet is associated with different communities at different appliances within an enterprise network, permitting customized routing policies.

Appliance 250*b* can check the export map for router 430 to determine whether to export the subnet 10.1.1.0/24 to router 430, which is a BGP neighbor. If the export map for router 430 does not permit community 700, then the subnet is not exported to that router. If the export map for router 430 does permit community 700, then the subnet is exported to that router. In the exemplary FIG. 6D, appliance 250*b* is only permitted to export route source types of communities 100, 200, or 400 to BGP neighboring router 430. Since appliance 250*b* notes this subnet as belonging to BGP community 700, the subnet 10.1.1.0/24 is not shared by appliance 250*b* with router 430.

In another example embodiment of FIG. 6A, appliances 250*a* and 250*b* communicate with one another via proprietary subnet sharing. Appliance 250*a* advertises its subnet 4.4.4.0/24 to appliance 250*b*. Since appliance 250*b* is not a BGP neighboring computing device, no BGP community identifier is attached to it. Thus, appliance 250*b* stores the subnet 4.4.4.0/24 in its database, such as a route table manager, for advertising to its BGP neighboring computing devices. The subnet is assigned a community of 200 since it originated from a shared appliance.

Appliance 250*b* can check the export map for router 430 to determine whether to export the subnet 4.4.4.0/24 to router 430, which is a BGP neighbor. If the export map for router 430 does not permit community 200, then the subnet is not exported to that router. If the export map for router 430 does permit community 200, then the subnet is exported to that router. In the exemplary FIG. 6D, appliance 250*b* is permitted to export route source types of community 200 to BGP neighboring router 430. Since appliance 250*b* notes this subnet as belonging to BGP community 200, the subnet 4.4.4.0/24 is shared by appliance 250*b* with router 430.

All BGP computing devices are part of an Autonomous System (AS) that has an AS number that uniquely identifies that system. Traditionally, the AS number is a 2-byte integer identifier or 4-byte integer identifier. In various embodiments, the BGP neighboring device is a router for an Internet Service Provider (ISP). The appliance may receive its own ASN from the ISP of the BGP neighbor to communicate via the BGP protocol with the neighboring devices. Then, when an appliance advertises the selected route source types to a BGP neighbor, it may also attach its own AS number as part of the community identifier for the route source type. Thus, the BGP neighbor will receive the community identifier including AS number and interpret it as opaque data, minimizing the risk of conflicting data being presented to the BGP neighbor. That is, two bytes (or four bytes) of information in the community identifier are the AS number for the appliance, and two bytes of information represent the community.

While embodiments of the present disclosure refer to BGP neighboring computing devices, the present disclosure is equally applicable to neighboring computing devices that utilize other protocols, such as OSPF (Open Shortest Path Fast) routes. That is, a community identifier can be designated for an OSPF route source type, in addition to, or instead of, the BGP route source type(s) and communities discussed herein and depicted in FIG. 5.

Further, if an IP address or subnet is learned from outside of an enterprise (cloud) network, even though it is not a BGP computing device, it can still be assigned a route source type and community identifier as discussed herein, and incorporated into a route exporting policy at each appliance in an enterprise network.

Additionally, while IP addresses and subnets are discussed generally herein, a person of ordinary skill in the art would understand that the disclosed principles are equally applicable public IP addresses, private IP addresses, and also to other network addressing schemes, such as MAC address.

Figure 8:
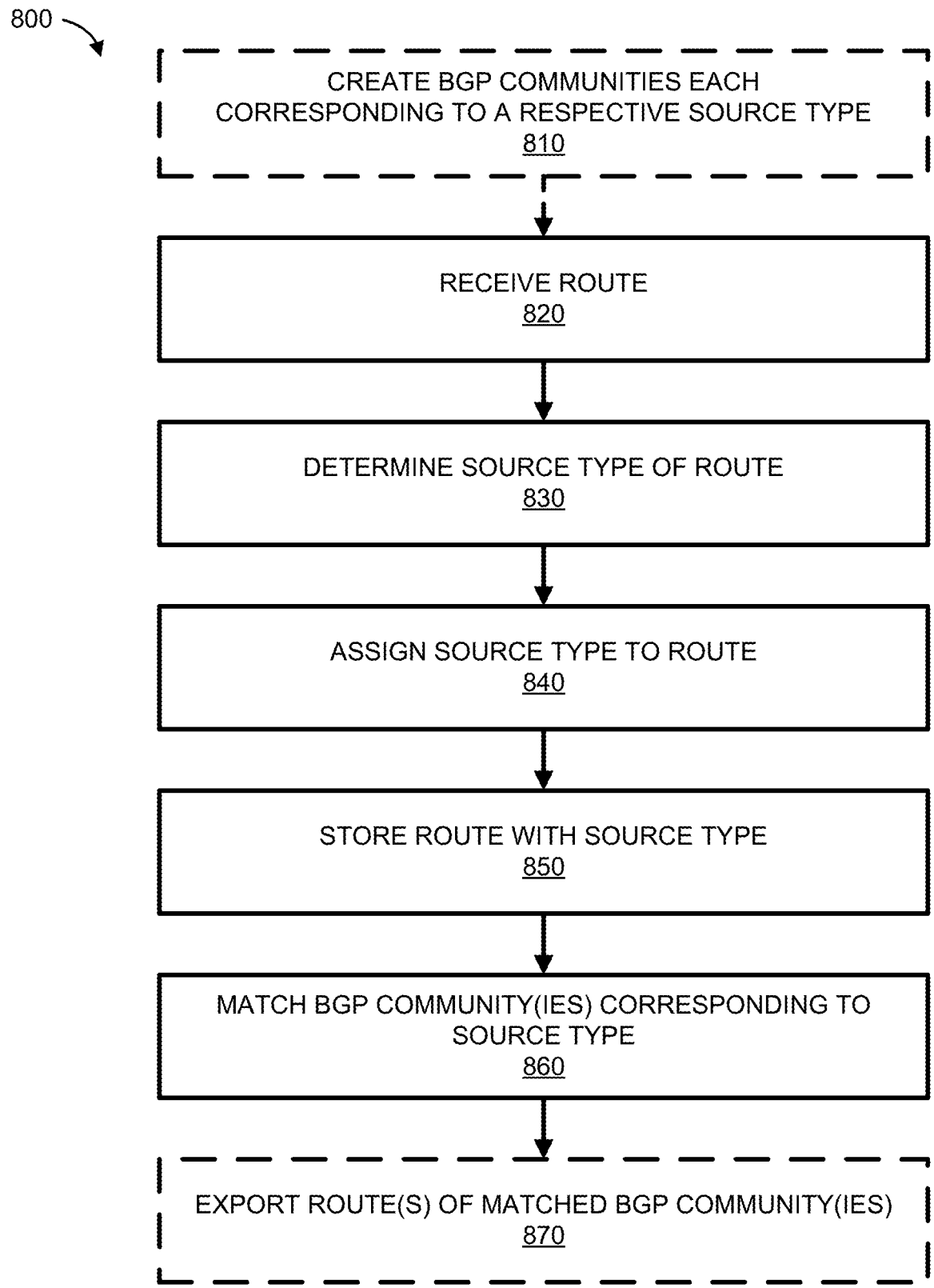
FIG. 8 is an exemplary process flowchart performed by a network appliance.

FIG. 8 is a flowchart of an exemplary process 800 performed by a network appliance for selectively exporting routes by the network appliance based on the source type of that route to a particular neighboring computing device. In optional step 810, BGP communities are created, with each community corresponding to a respective source type. As discussed herein, while BGP communities are used in this exemplary figure, other types of communities for network devices communicating via other protocols (other than BGP) may also be utilized.

In step 820 of the exemplary process, a route or routing information is received by a network appliance. The route may be received by a BGP neighboring device such as a router, or via a peer network appliance. In some embodiments, a module within the network appliance itself generates the routing information. In step 830, the network appliance determines the source type of the received route information. That is, the appliance determines where the route information was learned from. In step 840, the appliance assigns a source type to the route information received. The source type may be assigned by a network appliance to the route information via a community identifier attached to the route information. The community identifier can be a text string or tag. The route information with assigned source type is stored by the network appliance at step 850 within an internal memory at the appliance, or at an external location in communication with the network appliance.

In step 860, a network appliance determines which routes to export to a neighboring computing device based on the custom export map for that neighboring computing device. That is, the appliance determines a match between a community identifier for a potential route to export and a community identifier for routes that are permitted to be exported to that particular neighboring computing device. The match is determined in accordance with an Address Exporting Route Map for each particular computing device, the Address Exporting Route Map being located within the network appliance or at a location in communication with the network appliance.

If at least one community is matched, the network appliance may export at least one route of the matched BGP community to the neighboring computing device in step 870. In some embodiments, all routes associated with matched communities are exported to the neighboring computing device. In other embodiments, only a subset of the matched routes are exported. Further, there may be a threshold limit as to the number of routes that are to be exported within a certain time period or to a particular neighboring computing device. If no communities are matched in step 860, then no routes are exported to that particular neighboring computing device by the network appliance in step 870.

FIG. 9 is a flowchart of an exemplary process 900 performed by each peer network appliance in an enterprise network for selectively exporting based on the source type of that route to a particular neighboring computing device. In step 910, each peer network appliance in an enterprise network receives information denoting source types that can be advertised to certain Autonomous Systems and/or border routers. While not depicted here, each source type can be assigned a corresponding BGP community identifier as a tag or string.

For each received source type permitted to be advertised, each peer network appliance is assigned a "do advertise" rule to the corresponding BGP community to the source type, in step 920. In step 930, a network appliance can generate a list of routes and corresponding BGP community identifiers that have a "do advertise" rule for advertising to the AS and/or border router. The list of routes may comprise any number of routes, including just one. In step 940, the generated list is provided to the AS and/or border router.

In various embodiments, each peer appliance in an enterprise network may have a different list of routes with a "do advertise" rule to a particular AS and/or border router since the source type is different based on network topology. That is, a particular AS and/or border router may have a different type of neighbor relationship to different network appliances in an enterprise network. Thus, the routes with a "do advertise" rule may be different for each appliance in an enterprise network to the same AS and/or border router. In this way, customized route exporting can be accomplished by a group of network appliances in an enterprise.

Thus, methods and systems for selective route exporting based on source type are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A computer-implemented method for selectively advertising routing information by a first network appliance to a neighboring computing device, the method comprising:
   receiving, at the first network appliance, one or more pieces of routing information from one or more sources, wherein a respective piece of routing information is from a source and indicates an IP subnet associated with the source;
   determining a source type for the respective piece of routing information from the source without requiring additional information;
   allocating a community identifier to the respective piece of routing information from the source based on the corresponding source type, wherein the community identifier uniquely identifies the corresponding source type at the first network appliance;
   mapping, in a first data structure, a respective neighboring computing device of the first network appliance to one or more community identifiers, wherein the mapping indicates that the neighboring computing device is permitted to receive a subset of the one or more pieces of routing information associated with the one or more community identifiers; and
   exporting by the first network appliance, the subset of the one or more pieces of routing information to the neighboring computing device based on the mapping.

2. The computer-implemented method of claim 1, wherein the one or more sources of the one or more pieces of routing information include at least one of: a border router, an edge router, and another network appliance.

3. The computer-implemented method of claim 1, wherein at least one of the one or more sources of the one or more pieces of routing information is internal to the first network appliance.

4. The computer-implemented method of claim 1, wherein a first source of the one or more sources is in a different autonomous system than the first network appliance, and wherein the one or more pieces of routing information is received using Border Gateway Protocol (BGP).

5. The computer-implemented method of claim 1, wherein the community identifier includes a BGP community string.

6. The computer-implemented method of claim 1, wherein the community identifier further comprises an autonomous system number.

7. The computer-implemented method of claim 1, wherein the first network appliance is a physical appliance or a virtual appliance.

8. A system for selectively advertising routing information by a first network appliance of a plurality of network appliances, to a neighboring computing device, the system comprising:
   a communication interface to receive one or more pieces of routing information from one or more sources, wherein a respective piece of routing information is received from a source and indicates an IP subnet associated with the source;
   an identifier generator to determine a source type for the respective piece of routing information from the source without requiring additional information;

a routing table manager to:
  allocate a community identifier to the respective piece of routing information from the source based on the corresponding source type, wherein the community identifier uniquely identifies the corresponding source type at the first network appliance;
  map, in a first data structure, a respective neighboring computing device of the first network appliance to one or more community identifiers, wherein the mapping indicates that the neighboring computing device is permitted to receive a subset of the one or more pieces of routing information associated with the one or more community identifiers; and
  export the subset of the one or more pieces of routing information to the neighboring computing device based on the mapping.

9. The system of claim 8, wherein the one or more sources include at least one of: a border router, an edge router, and another network appliance.

10. The system of claim 8, wherein the community identifier includes a Border Gateway Protocol (BGP) community string.

11. The system of claim 8, wherein a first source of the one or more sources is in a different autonomous system than the first network appliance, and wherein the one or more pieces of routing information is received using Border Gateway Protocol (BGP).

12. A non-transitory computer readable medium having embodied thereon a program, the program being executable by a processor for selectively advertising routing information by a first network appliance to a neighboring computing device, the method comprising:
  receiving, at the first network appliance, one or more pieces of routing information from one or more sources, wherein tea respective piece of routing information is received from a source and indicates an IP subnet associated with the source;
  determining a source type for the respective piece of routing information from the source without requiring additional information;
  allocating a community identifier to the respective piece of routing information from the source based on the corresponding source type, wherein the community identifier uniquely identifies the corresponding source type at the first network appliance;
  mapping, in a first data structure, a respective neighboring computing device of the first network appliance to one or more community identifiers, wherein the mapping indicates that the neighboring computing device is permitted to receive a subset of the one or more pieces of routing information associated with the one or more community identifiers; and
  exporting, by the first network appliance, the subset of the one or more pieces of routing information to the neighboring computing device based on the mapping.

13. The non-transitory computer-readable medium of claim 12, wherein a first source of the one or more sources include at least one of: a border router, an edge router, and another network appliance.

14. The non-transitory computer-readable medium of claim 12, wherein exporting the subset of the one or more pieces of routing information further comprises exporting an autonomous system number and the community identifier with the subset of the one or more pieces of routing information.

15. A computer-implemented method for selectively advertising routing information by a first network appliance to a neighboring computing device, the method comprising:
  receiving, at the first network appliance, one or more pieces of routing information from one or more sources, wherein a respective piece of routing information is received from a source and indicates an IP subnet associated with the source;
  determining a source type for the respective piece of routing information from the source;
  allocating a community identifier to the respective piece of routing information from the source based on the corresponding source type, wherein the community identifier uniquely identifies the corresponding source type at the first network appliance;
  mapping, in a first data structure, a respective neighboring computing device of the first network appliance to one or more community identifiers, wherein the mapping indicates that the neighboring computing device is permitted to receive a subset of the one or more pieces of routing information associated with the one or more community; and
  exporting, by the first network appliance, the subset of the one or more pieces of routing information to the neighboring computing device based on the mapping.

16. The computer-implemented method of claim 1, wherein exporting the subset of the one or more pieces of routing information further comprises exporting an autonomous system number and the community identifier with the subset of the one or more pieces of routing information.

17. The system of claim 8, wherein at least one of the one or more sources of the one or more pieces of routing information is internal to the first network appliance.

18. The system of claim 8, wherein the routing table manager is further to export an autonomous system number and the community identifier with the subset of the one or more pieces of routing information.

19. The non-transitory computer-readable medium of claim 12, wherein at least one of the one or more sources of the one or more pieces of routing information is internal to the first network appliance.

20. The non-transitory computer-readable medium of claim 12, wherein the community identifier includes a Border Gateway Protocol (BGP) community string.

21. The non-transitory computer-readable medium of claim 12, wherein a first source of the one or more sources is in a different autonomous system than the first network appliance, and wherein the one or more pieces of routing information is received using BGP.

* * * * *